F. X. ATZBERGER.
BUSHING PULLER.
APPLICATION FILED OCT. 30, 1918.

1,310,270.

Patented July 15, 1919.

WITNESSES

INVENTOR
Frank X. Atzberger
BY
ATTORNEYS

UNITED STATES PATENT OFFICE.

FRANK X. ATZBERGER, OF EAST ISLIP, NEW YORK.

BUSHING-PULLER.

1,310,270.  Specification of Letters Patent.  Patented July 15, 1919.

Application filed October 30, 1918. Serial No. 260,394.

*To all whom it may concern:*

Be it known that I, FRANK X. ATZBERGER, a citizen of the United States, and a resident of East Islip, in the county of Suffolk and State of New York, have invented a new and Improved Bushing-Puller, of which the following is a full, clear, and exact description.

The object of the invention is to provide a new and improved bushing puller arranged to permit the user to conveniently and quickly remove a worn out or otherwise defective bushing from its support with a view to replace such bushing by a new one. Another object is to permit the use of the bushing puller on the front spring perch of an automobile with a view to remove the bushing from the perch in case the bushing is worn out by the bolt of the spring shackle.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in both views.

Figure 1:
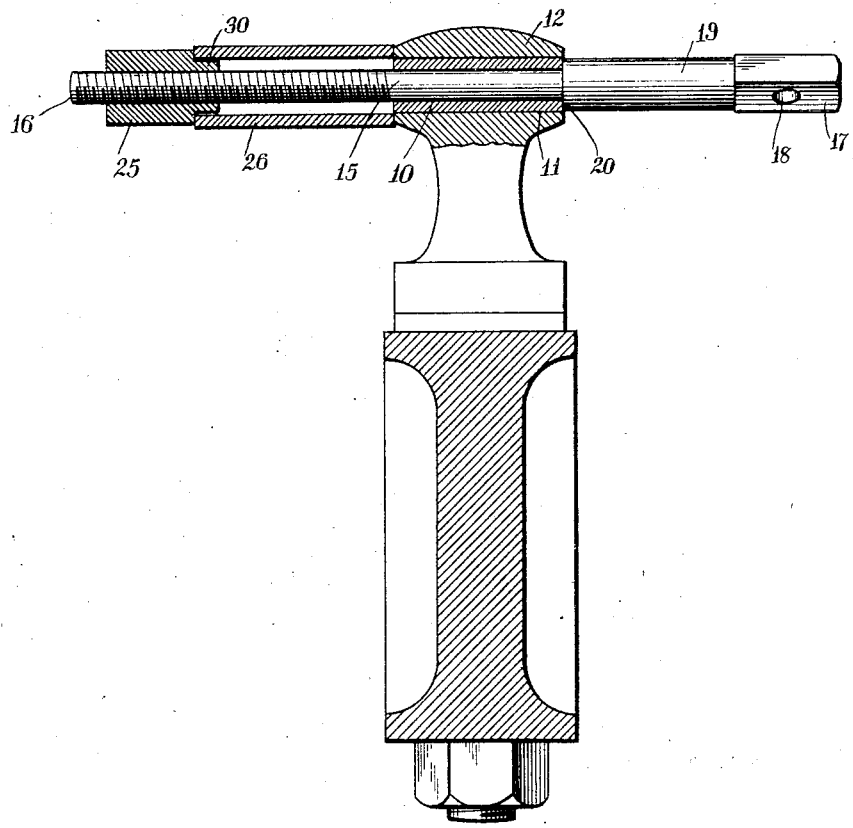
Figure 2:
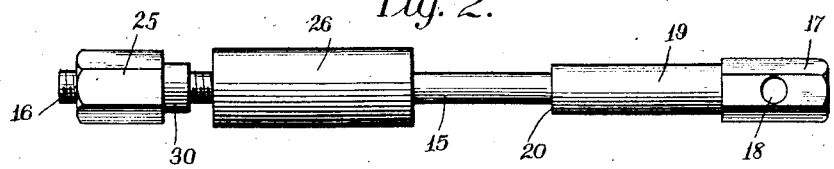

Figure 1 is a longitudinal central section of the bushing puller as applied for removing the bushing in one of the front spring perches of an automobile; and Fig. 2 is a side elevation of the bushing.

The bushing 10 to be removed by the improved bushing puller is held in a hole 11 of a support 12 such as one of the front spring perches of an automobile. The bushing puller is in the form of a screw rod 15 provided at one end with threads 16 and at the other end with a head 17 having an opening 18 therethrough for the application of a rod for turning the screw rod as hereinafter more fully explained. The screw rod 15 is provided adjacent the head 17 with an enlarged portion 19 forming a shoulder 20 with the screw rod 15, and this shoulder 20 is adapted to abut against one end of the bushing 10. The enlargement 19 is slightly less in diameter than that of the bushing 10 and its hole 11 so that the enlargement 19 can pass into the hole 11.

On the threaded end 16 of the screw rod 15 screws a nut 25 against the inner face of which abuts the outer end of a sleeve 26 abutting at its other end against the support 12 adjacent the end of the bushing 10 opposite the one engaged by the shoulder 20, as plainly shown in Fig. 1. The inner diameter of the sleeve 26 is slightly in excess of the exterior diameter of the bushing 10 so that the latter can pass into the said sleeve 26, the sleeve being sufficiently long to accommodate the bushing 10 when the latter is pushed out of its hole 11. The inner face of the nut 25 is provided with a centering shoulder 30 fitting into the outer end of the sleeve 26 to hold the latter centered relative to the screw rod 15 and the bushing 10.

The bushing puller is used as follows: The nut 25 is unscrewed from the threaded end 16 of the screw rod 15 and the sleeve 26 is removed from the screw rod and then the latter is passed through the bore of the bushing 10 until the shoulder 20 abuts against one end of the bushing 10. The sleeve 26 is now placed in position on the screw rod with its inner end abutting against the support 12 and then the nut 25 is screwed onto the threaded end 16 of the screw rod to engage the outer end of the sleeve 26, as previously explained. The bushing puller is now in the position shown in Fig. 1 and the operator now turns the screw rod 15 by using a bar or other tool on the head 17 for turning purposes. On turning the screw rod 15, the nut 25 is screwed up on the threaded end 16 and in doing so a pull is exerted lengthwise on the screw rod 15 thus moving the screw rod from the right to the left and causing its shoulder 20 to push the bushing 10 out of the hole 11 of the support 12. The bushing 10 finally passes into the sleeve 26 and when this has been done the screw rod 15 is turned in the opposite direction to unscrew the nut 25 with a view to remove the nut from the screw rod and also the sleeve 26 with the bushing 10 contained therein. The screw rod 15 can now be pulled out of the hole 11 of the support 12 and a new bushing can be inserted in the hole 11.

The bushing puller shown and described is very simple in construction and can be readily applied and operated for pulling a bushing out of its support. Although I have shown and described the bushing puller for pulling a bushing out of one of the front spring perches of an automobile I do not limit myself to this particular use of the bushing puller.

The bushing puller may also be used for placing a new bushing in position in the hole 11 of the support 12 and for this purpose the sleeve 26 is slipped onto the enlarged portion 19 to abut against one side of the support and the new bushing is placed on the screw rod and the nut 25 is reversed and screwed on the thread 16 to push the bushing into the hole on screwing up the nut 25.

Having thus described my invention, I claim as new and desire to secure by Letters Patent:

1. A bushing puller or bushing replacer, comprising a screw rod, a head on one end of the screw rod, an enlarged portion on the screw rod adjacent the head, a sleeve on the screw rod and adapted to fit over the enlarged portion, and a nut screwing on the said screw rod and adapted to engage the outer end of the said sleeve.

2. A bushing puller, comprising a screw rod adapted to be passed through a bushing to be pulled out of its support, the rod having a shoulder intermediate the ends and adapted to abut against one end of the bushing, a nut screwing on the said screw rod, and a sleeve through which passes the said screw rod, the outer end of the sleeve being engaged by the said nut and the inner end of the sleeve being adapted to engage the bushing support adjacent the other end of the bushing to allow the bushing to pass into the sleeve on screwing up the nut.

3. A bushing puller, comprising a screw rod adapted to be passed through a bushing to be pulled out of its support, the rod having a shoulder intermediate the ends and adapted to abut against one end of the bushing, a nut screwing on the said screw rod and provided at its inner end with a centering shoulder, and a sleeve through which passes the said screw rod, the outer end of the sleeve abutting against the said nut, and the latter's centering shoulder fitting into the outer end of the sleeve, the inner end of the sleeve being adapted to abut against the bushing support adjacent the other end of the bushing to allow the bushing to pass into the sleeve on screwing up the nut.

4. A bushing puller, comprising a screw rod having at one end a head and an enlarged portion adjacent the head, the enlarged portion forming a shoulder with the screw rod and being approximately of a diameter corresponding to that of the bushing, the shoulder being adapted to abut against one end of the bushing, a nut screwing on the threaded end of the screw rod and having on its inner face a centering shoulder and a sleeve through which passes the screw rod, the outer end of the sleeve abutting against the inner face of the said nut and the shoulder of the latter fitting into the outer end of the sleeve, the other end of the sleeve abutting against the bushing support adjacent the other end of the bushing, the inner diameter of the sleeve being in excess of the outer diameter of the bushing to allow the latter to pass into the sleeve on screwing up the nut.

FRANK X. ATZBERGER.